(12) United States Patent
Griffo et al.

(10) Patent No.: US 7,235,211 B2
(45) Date of Patent: *Jun. 26, 2007

(54) ROTARY CONE BIT WITH FUNCTIONALLY-ENGINEERED COMPOSITE INSERTS

(75) Inventors: Anthony Griffo, The Woodlands, TX (US); Zhigang Fang, Salt Lake City, UT (US); Robert Denton, Pearland, TX (US)

(73) Assignee: Smith International, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/454,374

(22) Filed: Jun. 3, 2003

(65) Prior Publication Data

US 2004/0040750 A1    Mar. 4, 2004

Related U.S. Application Data

(63) Continuation-in-part of application No. 09/846,944, filed on May 1, 2001, now Pat. No. 6,571,889.

(60) Provisional application No. 60/200,851, filed on May 1, 2000.

(51) Int. Cl.
*B22F 7/04* (2006.01)
(52) U.S. Cl. ............................................ 419/5; 419/18
(58) Field of Classification Search .................... 419/5, 419/18
See application file for complete search history.

(56) References Cited

U.S. PATENT DOCUMENTS 4,101,318 A * 7/1978 Rudy ........................... 75/240
4,124,888 A 11/1978 Washburn ................... 364/200
4,341,577 A 7/1982 Vandenburgh ............... 156/121
4,359,335 A 11/1982 Garner (Continued)

FOREIGN PATENT DOCUMENTS

EP    0357379    3/1990

(Continued)

*Primary Examiner*—George Wyszomierski
(74) *Attorney, Agent, or Firm*—Jeffer, Mangels, Butler & Marmaro LLP (57) ABSTRACT

A rotary cone bit, having a functionally-engineered surface of this invention, comprises a bit body having at least one leg extending therefrom, and a cone that is rotatably disposed on the leg. The cone typically comprises a plurality of cutting elements that project outwardly therefrom. The cutting elements comprises a cermet material selected from the group consisting of refractory metal carbides, nitrides, borides, carbonitrides and mixtures thereof. A functionally-engineered material is disposed over a surface portion of at least one of the cutting elements to form a wear resistant surface thereon. The wear resistant surface has a hardness that is different than that of the underlying cutting element. The wear resistant surface is provided by forming a conformable material mixture by combining one or more powders selected from the group consisting of cermets, carbides, borides, nitrides, carbonitrides, refractory metals, Co, Fe, Ni, and combinations thereof, with an applying agent. The applied material mixture is pressurized under conditions of elevated temperature to consolidate and sinter the material mixture, thereby forming the wear resistant surface. The material mixture is consolidated and sintered in a manner that avoids unwanted material migration between the applied material mixture and substrate, thereby providing a fully-densified wear surface having desired properties of hardness and/or fracture toughness.

10 Claims, 1 Drawing Sheet

U.S. PATENT DOCUMENTS

| | | | |
|---|---|---|---|
| 4,428,906 A | | 1/1984 | Rozmus .................... 419/48 |
| 4,593,776 A | * | 6/1986 | Salesky et al. ............. 175/375 |
| 4,597,456 A | * | 7/1986 | Ecer |
| 4,643,620 A | * | 2/1987 | Fujii et al. ................. 407/119 |
| 4,656,002 A | | 4/1987 | Lizenby et al. ............. 419/10 |
| 4,744,943 A | | 5/1988 | Timm ....................... 419/10 |
| 4,945,073 A | | 7/1990 | Dubensky et al. .......... 501/93 |
| 5,027,878 A | * | 7/1991 | Revankar et al. ........... 164/98 |
| 5,290,507 A | | 3/1994 | Runkle ..................... 419/14 |
| 5,370,195 A | * | 12/1994 | Keshavan et al. ....... 175/420.2 |
| 5,594,931 A | | 1/1997 | Krall et al. |
| 5,623,723 A | * | 4/1997 | Greenfield .................. 419/6 |
| 5,644,956 A | * | 7/1997 | Blackman et al. |
| 5,880,382 A | * | 3/1999 | Fang et al. ................. 75/236 |
| 6,063,333 A | * | 5/2000 | Dennis |
| 6,063,502 A | | 5/2000 | Sue et al. ................... 428/469 |
| 6,138,779 A | * | 10/2000 | Boyce |
| 6,170,583 B1 | * | 1/2001 | Boyce ....................... 175/426 |
| 6,209,420 B1 | * | 4/2001 | Butcher et al. ............. 76/108.2 |
| 6,389,699 B1 | * | 5/2002 | Ecer ......................... 30/346.54 |
| 6,454,027 B1 | * | 9/2002 | Fang et al. ................. 175/374 |
| 6,571,889 B2 | * | 6/2003 | Griffo et al. ................ 175/371 |

FOREIGN PATENT DOCUMENTS

| | | | |
|---|---|---|---|
| EP | 0 733 424 | | 9/1996 |
| EP | 0 733 424 A2 | | 9/1996 |
| EP | 0937781 A1 | * | 8/1999 |
| GB | 2 017 153 | | 10/1979 |
| GB | 2 017 153 A | | 10/1979 |
| GB | 2 275 690 | | 9/1994 |
| GB | 2 275 690 A | | 9/1994 |
| GB | 1393116 | * | 5/1995 |
| GB | 2376242 A | * | 12/2002 |
| JP | 9-268303 | | 10/1997 |

* cited by examiner

ROTARY CONE BIT WITH FUNCTIONALLY-ENGINEERED COMPOSITE INSERTS

CROSS-REFERENCE TO RELATED APPLICATIONS

This application is a continuation of U.S. patent application Ser. No. 09/846,944, filed on May 1, 2001 now U.S. Pat. No. 6,571,889, which application claimed the priority of U.S. Provisional Application No. 60/200,851, filed on May 1, 2000.

FIELD OF THE INVENTION

This invention relates to rotary cone bits used for subterranean drilling and, more particularly, to rotary cone bits having functionally-engineered composite surfaces, and methods for forming the same, having improved mechanical properties of wear resistance and toughness when compared to conventional rotary cone bits.

BACKGROUND OF THE INVENTION

Cemented tungsten carbide, such as WC—Co is well known for its mechanical properties of hardness, toughness and wear resistance, making it a popular material of choice for use in such industrial applications as mining and drilling where its mechanical properties are highly desired. Because of its desired properties, cemented tungsten carbide has been the dominant material used on rotary cone rock bit surfaces exposed to wear, e.g., on cutting inserts used with rotary cone rock bits. The mechanical properties associated with cemented tungsten carbide and other cermets, especially the unique combination of hardness, toughness and wear resistance, make these materials more desirable than either metals or ceramics alone.

It is known in the art that for cemented tungsten carbide, fracture toughness is inversely proportional to hardness, and wear resistance is proportional to hardness. Accordingly, when using cemented tungsten carbide as a wear surface one must balance the demand for high wear resistance with the desire to have an acceptable degree of fracture toughness. A cemented tungsten carbide material having a high degree of wear resistance may not provide a sufficient degree of fracture resistance for drilling applications, resulting in a wear surface that is brittle and thus susceptible to gross brittle fracture. A cemented tungsten carbide material having a high degree of fracture resistance, while not being brittle and having acceptable impact resistance, may not have a suitable degree of wear resistance for drilling applications.

A known approach for addressing this issue of competing desired properties has been to use a cemented tungsten carbide substrate, and place a cemented tungsten carbide material over the substrate to provide a relatively-more wear resistant surface thereon. In this approach, the cemented tungsten carbide placed on the substrate is specially formulated to provide a greater cemented tungsten carbide placed on the substrate is specially formulated to provide a greater degree of wear resistance than that of the underlying substrate, and the substrate is formulated to provide a greater degree of fracture toughness than the surface layer. The cemented tungsten carbide used as the wear surface is bonded to the substrate and consolidated by the process of liquid phase sintering.

A known limitation with this approach, however, is that the interface between the substrate and the surface layer must be flat or planar. Thus, this approach is not useful for addressing the need to provide a wear surface formed from cemented tungsten carbide, having both a desired degree of wear resistance and fracture toughness, on a substrate having an irregular or nonplanar interface surface, e.g., an interface surface having a variable or constant radius of curvature.

A further known limitation with this approach is the reliance upon liquid phase sintering to bond the cemented tungsten carbide substrate and surface layer together. During the process of liquid phase sintering it is known that the ductile metal component, e.g., cobalt metal, liquefies and migrates across the boundary or interface between the substrate and surface layer. This migration is not desired because it reduces the intended differential between the two material compositions across the interface, causing the interface to become homogeneous and the related differential material properties to be minimized or eliminated. For example, during liquid phase sintering the cobalt metal constituent in the substrate can migrate into the surface layer, where less of the cobalt metal constituent is desired to provide the desired degree of wear resistance. In this instance, such migration causes an undesired reduction in the wear resistance provided by the surface layer. Thus, this phenomena of liquid phase migration is known to limit the ability to control surface layer properties by use of a material differential approach.

Cemented tungsten carbide constructions known in the art are typically formed into the shape of a green part in sheet form that is sintered to an underlying substrate during the above-described liquid phase consolidation process. The above-described process of forming the green part and the finally-sintered product both limits the types of constructions that can be used to form the final product, e.g., constructions comprising complex microstructures or multiple layers may be outside the scope of practical manufacturing capabilities, and limits the types of products that can include the complex construction, e.g., products having an irregular shape or a nonplanar substrate surface (such as those developed by residual stress analysis), may also be outside of the scope of practical manufacturing capabilities. In many rotary cone rock bit applications, it is desired that a portion of the bit or cutting element having a nonplanar surface comprising a layer of cemented tungsten carbide disposed thereon for purposes of improving wear resistance and fracture toughness at that location.

It is, therefore, desired that functionally-engineered composite surfaces, for use with rotary cone rock bits, be prepared according to principles of this invention in a manner that does not adversely impact the physical properties of either the substrate or the surface material, e.g., in a manner that avoids ductile phase metal migration, when compared to wear resistant surfaces applied by liquid phase sintering method. It is desired that such functionally-engineered composite surfaces be formed in a manner that permits use on substrates having irregular or nonplanar interface geometries. It is further desired that functionally-engineered composite surfaces of this invention provide an improved degree of wear resistance and fracture toughness when compared to conventional cemented tungsten carbide surfaces formed using liquid phase sintering methods.

SUMMARY OF THE INVENTION

Functionally-engineered composite wear surfaces, prepared according to principles of this invention, are provided on cutting elements used with rotary cone rock bits, and can be specially engineered to provide a desired degree of wear resistance and/or fracture toughness necessary to meet particular drilling applications. Cutting elements comprising functionally-engineered composite wear surfaces of this invention are formed in a manner that both avoids unwanted material migration, between the wear surface and substrate, and that permits application on nonplanar, e.g., curved, interface surfaces, thereby enabling placement of wear surfaces where not before practical.

As mentioned above, functionally-engineered composites of this invention are used with rotary cone bits that comprise a bit body having at least one leg extending therefrom, and a cone that is rotatably disposed on the leg. The cone typically comprises a plurality of cutting elements that project outwardly therefrom. The cutting elements may comprise a cermet material selected from the group consisting of refractory metal carbides, nitrides, borides, carbonitrides and mixtures thereof A functionally-engineered material is disposed over a surface portion of at least one of the cutting elements to form a wear resistant surface thereon. The wear resistant surface has a hardness that is different than that of the underlying cutting element. The wear resistant surface is formed by forming a conformable material mixture by combining one or more powders selected from the group consisting of cermets, carbides, borides, nitrides, carbonitrides, refractory metals, Co, Fe, Ni, and combinations thereof, with an applying agent.

As used herein, the term conformable is used to describe the nature of the mixture as being in a physical state that readily conforms to an interface surface of the substrate, e.g., being in the form of a semi-plastic material or a liquid slurry. The conformable material mixture is applied to the interface surface of the cutting element to provide a green state material layer thereon. Depending on the particular application, the material mixture can be applied in the form of a coating onto the interface surface or, prior to application, can be preformed into a part shaped to fit over the interface surface, which is later applied over the interface surface.

DESCRIPTION OF THE DRAWINGS

These and other features and advantages of the present invention will become appreciated as the same becomes better understood with reference to the specification, claims and drawings wherein:

DETAILED DESCRIPTION OF THE INVENTION

Rotary cone bits, prepared according to the practice of this invention, comprise functionally-engineered surfaces formed from composite constructions that are applied in a manner that minimizes both unwanted material migration from the construction (thereby retaining desired composite construction material properties) and surface irregularities (thereby ensuring desired surface wear properties and service life). Further, such functionally-engineered surfaces are applied in a manner that permits their use on substrates having nonplanar or irregular surface geometries.

Composite constructions used for forming functionally-engineered surfaces on rotary cone bits comprise a material microstructure having one or more material phases. The terms "functionally engineered," as used herein, refers to the fact that the composite construction material microstructure has been specifically designed and manufactured to provide one or more particular physical properties, e.g., wear resistance and/or fracture toughness, suited for a particular final product application.

Figures 1, 2, 3:
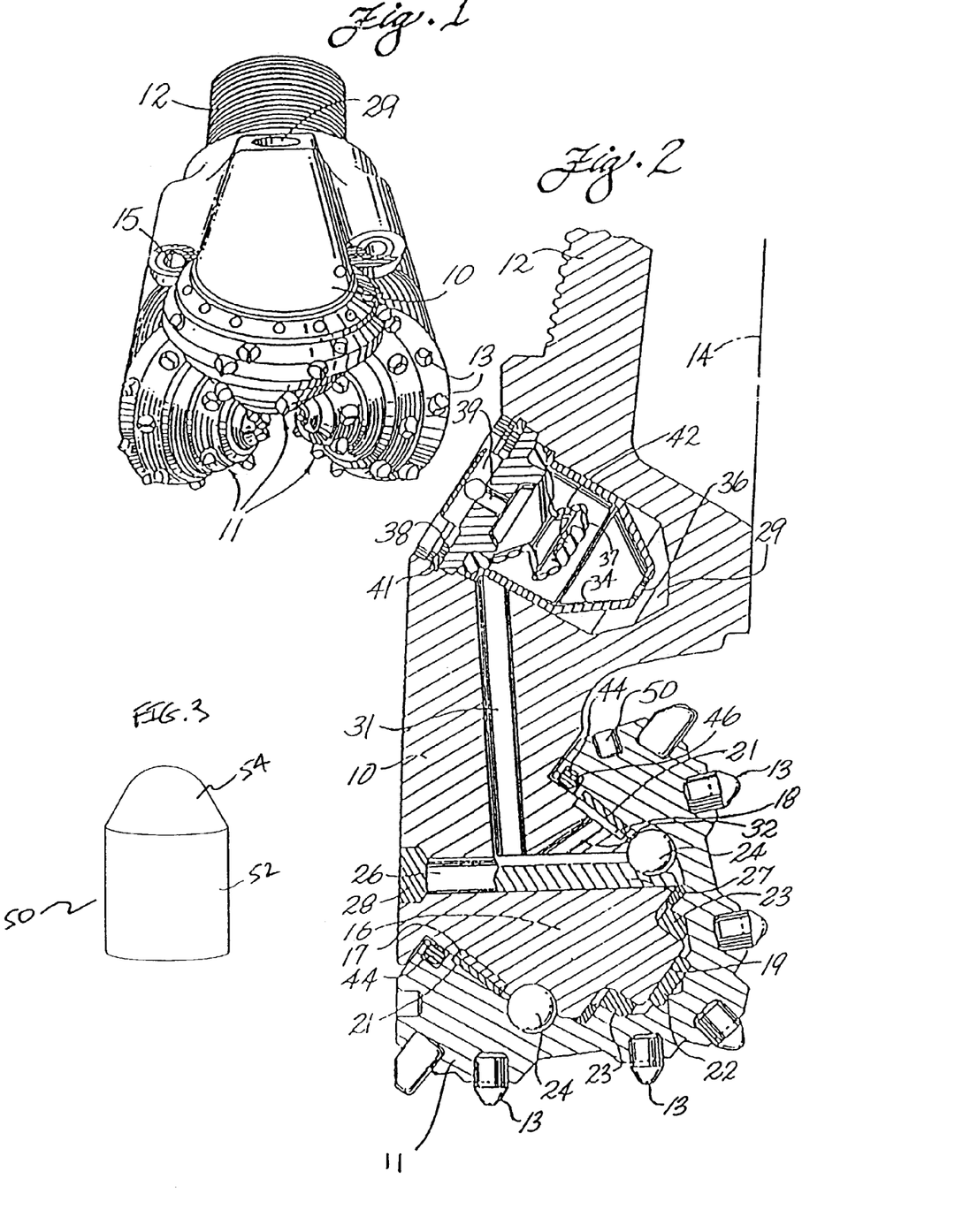
FIG. 1 is a perspective side view of a rotary cone rock bit comprising a functionally-engineered surface layer provided according to principals of the invention.
FIG. 2 is a fragmentary, longitudinal cross-section of the rotary cone rock bit of FIG. 1.
FIG. 3 is a schematic perspective side view of a cutting element used with the rock bit of FIG. 1 comprising a functionally-engineered surface layer provided according to principles of the invention.

Functionally-engineered surfaces formed according to principles of this invention are intended to be used on substrates that are exposed to extreme conditions of wear and impact, such as subterranean drilling bits for purposes of extending the service life of such equipment. FIG. 1 illustrates a rotary cone rock bit comprising a functionally-engineered surface of this invention. The rock bit comprises a body 10 having three cutter cones 11 mounted on its lower end. A threaded pin 12 is at the upper end of the body for assembly of the rock bit onto a drill string for drilling oil wells or the like. A plurality of inserts 13 are pressed into holes in the surfaces of the cutter cones for bearing on the rock formation being drilled. Nozzles 15 in the bit body introduce drilling fluid into the space around the cutter cones for cooling and carrying away formation chips drilled by the bit.

FIG. 2 is a fragmentary, longitudinal cross-section of a rock bit, extending radially from the rotational axis 14 of the rock bit through one of the three legs on which the cutter cones 11 are mounted. Each leg includes a journal pin extending downwardly and radially, inwardly on the rock bit body. The journal pin includes a cylindrical bearing surface having a hard metal insert 17 on a lower portion of the journal pin. The hard metal insert can be formed from a variety of hard metals, as better described below, and is welded in place in a groove on the journal leg, and has a substantially greater hardness that the steel forming the journal pin and rock bit body.

An open groove 18 is provided on the upper portion of the journal pin. Such a groove may, for example, extend around 60 percent or so of the circumference of the journal pin, and the hard metal insert 17 can extend around the remaining 40 percent or so. The journal pin also has a cylindrical nose 19 at its lower end.

Each cutter cone 11 is in the form of a hollow, generally-conical steel body having inserts 13 that provide the drilling action by engaging a subterranean rock formation as the rock bit is rotated. As described in better detail below, such cutting inserts can be formed from a carbide-containing material and have a functionally-engineered surface prepared according to principles of this invention to provide enhanced wear resistance and improved fracture toughness.

The cavity in the cone contains a cylindrical bearing surface including an aluminum bronze insert 21 deposited in a groove in the steel of the cone or as a floating insert in a groove in the cone. The aluminum bronze insert 21 in the cone engages the hard metal insert 17 on the leg and provides the main bearing surface for the cone on the bit body. A nose button 22 is between the end of the cavity in the cone and the nose 19 and carries the principal thrust loads of the cone on the journal pin. A bushing 23 surrounds the nose and provides additional bearing surface between the cone and journal pin. Other types of bits, particularly for higher rotational speed applications, have roller bearings instead of the journal bearings illustrated herein. It is to be understood that O-ring seals constructed according to principles of this invention may be used with rock bits comprising either roller bearings or conventional journal bearings.

A plurality of bearing balls 24 are fitted into complementary ball races in the cone and on the journal pin. These balls are inserted through a ball passage 26, which extends through the journal pin between the bearing races and the exterior of the rock bit. A cone is first fitted on the journal pin, and then the bearing balls 24 are inserted through the ball passage. The balls carry any thrust loads tending to remove the cone from the journal pin and thereby retain the cone on the journal pin. The balls are retained in the races by a ball retainer 27 inserted through the ball passage 26 after the balls are in place. A plug 28 is then welded into the end of the ball passage to keep the ball retainer in place.

The bearing surfaces between the journal pin and the cone are lubricated by a grease. Preferably, the interior of the rock bit is evacuated, and grease is introduced through a fill passage (not shown). The grease thus fills the regions adjacent the bearing surfaces plus various passages and a grease reservoir, and air is essentially excluded from the interior of the rock bit. The grease reservoir comprises a cavity 29 in the rock bit body, which is connected to the ball passage 26 by a lubricant passage 31. Grease also fills the portion of the ball passage adjacent the ball retainer, the open groove 18 on the upper side of the journal pin, and a diagonally extending passage 32 therebetween. Grease is retained in the bearing structure by a resilient seal in the form of an annular seal 44 between the cone and journal pin.

A pressure compensation subassembly is included in the grease reservoir 29. The subassembly comprises a metal cup 34 with an opening 36 at its inner end. A flexible rubber bellows 37 extends into the cup from its outer end. The bellows is held into place by a cap 38 with a vent passage 39. The pressure compensation subassembly is held in the grease reservoir by a snap ring.

Rotary cone bits such as those illustrated in FIGS. 1 and 2 comprise a functionally-engineered surface formed from a composite construction and prepared according to principles of this invention. The functionally-engineered surface can be positioned along any surface of the bit calling for an improved degree of wear resistance. Typically, functionally-engineered surfaces of this invention are applied to portions of the rock bit cone and/or cutting elements, e.g., cutting inserts or steel teeth in a milled tooth bit.

FIG. 3 illustrates a cutting element removed from the rock bit in the form of an insert 50. The insert 50 comprises a generally cylindrical body 52 that is formed from a material that is relatively harder than the cone, e.g., a steel or carbide-containing material such as cemented tungsten carbide. The insert 50 includes a functionally-engineered wear surface 54, prepared according to principles of this invention, disposed along an axial end of the insert opposite the end that is attached to the cone.

Functionally-engineered wear surfaces of this invention are formed from composite constructions that can be in the form of: (1) a coating having a single layer, made up of one or more materials, that is disposed onto a substrate surface; (2) a coating of two or more layers, each made up of one or more material, that are disposed onto a substrate surface; or (3) a part made up of one or more materials that itself forms the final product used to perform the product application. Referring to the embodiment illustrated in FIG. 3, the wear surface 54 can comprise single or multiple layers of materials disposed onto the substrate. Alternatively, the substrate itself, i.e., the insert body, can be formed entirely from the desired composite construction material, in which case inherently providing the functionally-engineered wear surface along its axial end.

Suitable materials that can be used as substrates for functionally-engineered wear surface of this invention include those selected from the group including steel materials, steel alloy materials, cermet materials, and mixtures thereof. The term "cermet,", as used herein, is understood to refer to those materials having both a ceramic and a metallic constituent. Such cermet materials comprise a material microstructure that is characterized by a plurality of hard phase grains that are bonded together by a metallic cementing agent. Example cermet materials that can be used as substrates include those comprising a hard grain constituent formed from carbides or borides of refractory metals such as W, Ti, Mo, Nb, V, Si, Hf, Ta, Cr, and a metallic cementing agent. Example hard grain materials include WC, Tic, TaC, $TiB_2$, or $Cr_2C_3$. The metallic cementing agent may be selected from the group of ductile materials including one or a combination of Co, Ni, Fe, W, Mo, Ti, Ta, V and Nb, which may be alloyed with each other or with C, B, Cr or Mn. Preferred cermets useful for forming the substrate include cemented tungsten carbide with cobalt as the binder phase (WC—Co), WC—Ni, WC—Fe, WC—(Co, Ni, Fe) and alloys thereof.

Another acceptable type of cermet that can be used to form substrates used with functionally-engineered wear surfaces of this invention is one having a double cemented cermet material microstructure. The term "double cemented" as used here refers to the fact that the material microstructure for such construction comprises a plurality of first phases made up of a cermet, distributed within a substantially continuous second phase made if from a relatively more ductile material. Because the each first phase comprises hard grains bonded together or cemented by a metallic cementing agent, and the first phases are themselves disposed within a second metallic cementing agent, the overall material microstructure is referred to as being double cemented. Example double cemented cermet constructions useful for forming substrates include those disclosed in U.S. Pat. No. 5,880,382, which is incorporated herein by reference, and which have a material microstructure comprising a plurality of first phases (each formed from the same types of cermet materials discussed above) that are distributed within a substantially continuous matrix second phase that is formed from a relatively more ductile material (such as those material discussed above useful for forming the cermet metallic cementing agent)

Additionally, substrates used with functionally-engineered wear surfaces of this invention can be formed from a diamond carbide composite material, such as that disclosed in U.S. patent application Ser. No. 09/521,717 filed on Mar. 9, 2000, which is incorporated herein by reference.

In a preferred embodiment, the substrate is formed from a double cemented cermet construction is one comprising first phases formed from cemented tungsten carbide (WC—Co), and a second phase formed from cobalt. More preferably, the substrate comprises a first phase comprising cemented tungsten carbide having the following compositional range: carbide component in the range of from about 75 to 97 percent by weight, and metallic cementing agent or binder in the range of from about 3 to 25 percent by weight.

Substrates used with functionally-engineered wear surfaces of this invention are in a preexisting rigid state at the time that the wear surface is applied thereto. For example, substrates in the form of a rotary cone or a cutting element are either forged and machined from steel bars, i.e., in the form of wrought or casting stock, or are sintered from metal powders, i.e., in the form of a fully- or partially-densified substrate.

Functionally-engineered wear surfaces of this invention are prepared from composite constructions comprising the following materials: cermets of carbides, nitrides, carbonitrides, and borides; steel; polycrystalline diamond particles, cubic boron nitride particles; and mixture thereof Cermet materials useful for forming the functionally-engineered wear surface include the group of cermet materials described above for forming the substrate.

An important feature of the functionally-engineered wear surface of this invention is that it display a degree of hardness that is different than that of the underlying substrate. In an example embodiment, where properties of high wear resistance is desired, it is desired that the composite construction selected to form the functionally-engineered wear surface provide a hardness (as measured using the Rockwell A scale) that is at least 0.5 greater than that of the underlying substrate. This minimum level of increased hardness is desired because hardness differences less than this would not show significant property differentials, in terms of wear versus toughness relationships. In another example embodiment, where properties of high fracture toughness is desired, it is desired that the composite construction selected to form the form the functionally-engineered wear surface provide a hardness (as measured using the Rockwell A scale) that is at least 0.5 less than that of the underlying substrate. Accordingly, it is to be understood that embodiments prepared according to principals of this invention can comprise functionally-engineered surfaces having a degree of hardness that can be greater or less than that of the substrate, depending on particular product application.

A key feature of this invention is the ability to provide the functionally-engineered wear surface onto a substrate interface surface having an irregular or nonplanar geometry. For example, functionally-engineered wear surfaces of this invention can be applied to a concave or convex substrate interface having a constant or irregular radius of curvature. For example, functionally-engineered wear surfaces of this invention can be applied to interface surfaces having a radius of curvature that range from infinity (flat) to 0.7 mm, depending on the particular application, e.g., insert size, with a preferred minimum radius of curvature being approximately 1.5 mm Another key feature of this invention is the ability to provide the functionally engineered wear surface onto a substrate without the undesired migration of materials, i.e., a ductile metal constituent, between the material interfaces. These features are accomplished by using methods (both of application and consolidation) that are different than those known in the art. Such methods not only provide the above-identified features, but enable formation of functionally engineered wear surfaces having complex microstructures and/or multiple layers. These methods include polymer-assisted forming methods, thermoforming methods, and injection molding methods. Each of these methods is described in greater detail below as follows:

Polymer-Assisted Forming

Generally speaking, polymer-assisted forming comprises the process of using one or more different applying agents in the form of polymers or organic binders to aid in forming a solution, from constituent material powders, which solution is then used to form a green part, e.g., for forming a coating onto an identified substrate surface. The use of an applying agent is desired as it introduces flexibility into the process of making a green part by enabling formation of a semi-plastic solution that can either be spray applied or dip applied onto the substrate surface to form a desired coating. Further, the use of polymer-assisted forming enables the creation of multi-layer composite constructions that can comprise the same or different materials in each layer, and enables the formation of coatings that have accurately controlled layer thicknesses.

Polymer-assisted forming involves the process of: (1) combining a desired material powder useful for forming the functionally-engineered wear surface, e.g., cermet powder, diamond particles, cubic boron nitride particles, carbides, nitrides, carbonitrides, borides, metals, metal alloys, and mixtures thereof, with an applying agent; (2) mixing the material powder and applying agent together to form a semi-plastic solution having a desired consistency; and (3) applying the solution to a desired substrate surface by dip, spray, brush, or roll technique. Alternatively, the material solution can comprise a double cemented carbide as disclosed in U.S. Pat. No. 5,880,382, incorporated herein by reference, or a diamond carbide composite as disclosed in U.S. patent application Ser. No. 09/521,717 filed on Mar. 9, 2000, which is incorporated herein by reference. Suitable polymer binders useful as applying agents for the polymer-assisted forming process include those capable of blending with the material powder to form a substantially homogeneous mixture and providing flexibility to the solid material (powder) to facilitate shaping. Additionally, the chosen polymer should have a desirable burnout behavior, enabling it to be removed from the product during processing without causing damage to the structure.

Example polymer binders include can include thermoplastic materials, thermoset materials, aqueous and gelation polymers, as well as inorganic binders. Suitable thermoplastic polymers include polyolefins such as polyethylene, polyethylene-butyl acetate (PEBA), ethylene vinyl acetate (EVA), ethylene ethyl acetate (EEA), polyethylene glycol (PEG), polysaccharides, polypropylene (PP), poly vinyl alcohol (PVA), polystyrene (PS), polymethyl methacrylate, methylethyl ketone (MEK), poly ethylene carbonate (PEC), polyalkylene carbonate (PAC), polycarbonate, poly propylene carbonate (PPC), nylons, polyvinyl chlorides, polybutenes, polyesters, waxes, fatty acids (stearic acid), natural and synthetic oils (heavy mineral oil), and mixtures thereof. Suitable thermoset plastics useful as the polymer binder include polystyrenes, nylons, phenolics, polyolefins, polyesters, polyurethanes. Suitable aqueous and gelation systems include those formed from cellulose, alginates, polyvinyl alcohol, polyethylene glycol, polysaccharides, water, and mixtures thereof Silicone is an example inorganic polymer binder.

Polymer-assisted forming can be used to provide a surface coating on substrates formed from the variety of materials disclosed above having either a planar or nonplanar interface surface. After the green part is formed, i.e., the substrate surface is coated with the slurry material, the coated surface is consolidated by high-temperature/high pressure process described below, to provide the desired fully-sintered functionally-engineered wear surface.

Polymer-assisted forming according to principles of this invention are better understood with reference to the following examples:

Dip Coating—WC—Co Dip Coated onto a WC—Co Substrate

A coating solution is prepared by combining in the range of from 10 to 70 percent by volume material powder selected from the group described above, with the remaining volume being the polymer binder. Using less than about 10 percent by volume material powder would provide a material mixture having too little solids to provide a surface layer having desired properties of wear or fracture toughness for most drilling applications. Using greater than about 70 percent by volume material powder would provide a material mixture that was too thick to facilitate proper application, and that could produce unwanted surface irregularities in the finally-formed surface layer.

In an example embodiment, the functionally-engineered wear surface is formed from cemented tungsten carbide. Thus, in the range of from 10 to 70 percent by volume WC—Co powder (comprising approximately 5 to 27 percent by weight Co and preferably 10 percent by weight Co) is mixed with a remaining volume percent of polymeric binder solution. If desired, WC powder and Co powder can be used instead of WC-Co powder. In a preferred embodiment, in the range of from 50 to 75 percent by volume of the WC—Co powder is used. In this example the polymer binder solution comprises approximately 20 percent by weight poly-propylcarbonate in methyl ethyl ketone (MEK) solution. The embodiment can use binder solutions containing from 5 to 50 weight percent polymer in solution. Moreover, solvents other than MEK may be utilized.

The polymer binder solution was combined with the material powder element and the ingredients were mixed together using a ball mill or other mechanical mixing means for approximately 8 hours. If desired, additional solvents or other types of processing additives, such as lubricants or the like, can be used to aid in the processability of the solution to control solution viscosity and/or to control desired coating thickness. The resulting solution has a semi-fluid consistency.

In this example embodiment, the substrate is formed from cemented tungsten carbide. As discussed above, the underlying substrate has a hardness that is at least 0.5 (as measured by Rockwell A hardness) less than that of the fully-sintered functionally-engineered wear surface. The substrate is dipped into the milled solution for a period of time that will vary depending on the make-up of the solution. In the example embodiment, where the material powder is WC—Co and the polymer binder comprises MEK present in the above identified proportions, the substrate surface is dipped into the solution for a period of approximately 5 seconds. The dipped surface is removed from the solution and allowed to dry for a period of time, e.g., in the example embodiment, approximately 1 minute. Again, drying time is understood to vary depending on the particular solution make up.

In the example described above, the substrate is an insert used with a drill bit for subterranean drilling (as illustrated in FIG. 3), and the coating solution is dip coated onto a working surface of the substrate to provide improved properties of wear resistance thereto. Using the dip coating process, a desired and accurately controllable surface layer coating thickness can be achieved by single or repeated dipping process.

Additionally, a multi-layer coating construction can be achieved on the surface of the substrate by repeating the dipping process using different dip coating solutions. This can be done, for example, to create a multi-layer substrate surface coating having a series of transition layers with gradient levels or one or more material, moving from the coating surface to the substrate surface, to provide a gradient of physical properties through the thickness of the coating.

The above-described dip process enables placement of a single-layer coating on a substrate surface having a thickness in the range of from about 0.04 to 3 millimeters, and enables placement of a multi-layer coating on a substrate surface having a thickness in the range of from 0.06 to 10 millimeters.

Spray Coating—WC—Co Spray Coated onto a WC—Co Substrate

A coating solution for spray coating can be prepared in the same manner as described above for dip coating, i.e., using the same proportions and types of material powder and polymeric binder solution. In another example embodiment, a coating solution useful for spray coating comprises approximately 60 percent by volume WC—Co powder (comprising approximately 10 percent by weight Co), and approximately 40 percent by volume IPA (using Nylon) or MEK (comprising approximately 20 percent by weight polypropylcarbonate). The material powder element and the two ingredients were mixed together using a ball mill. If desired, solvents or other types of processing additives, such as lubricants or the like, can be used to aid in the processability of the solution to control solution viscosity and/or to control desired coating thickness.

The resulting solution is sprayed onto a substrate surface and the just-applied surface coating is allowed to dry as described above. Like the dip coating process, a desired surface layer coating thickness can be achieved by repeating the spraying process. Additionally, a multi-layer coating construction can be achieved on the surface of the substrate by repeating the spraying process using different spray coating solutions, as described above for the dip coating process. The above-described spray coating process enables placement of a single-layer coating on a substrate surface having a thickness in the range of from 0.04 to 3 millimeters, and enables placement of a multi-layer coating on a substrate surface having a thickness in the range of from 0.06 to 10 millimeters.

Molding Techniques

Generally speaking, molding techniques useful for forming functionally-engineered wear surfaces of this invention comprise process steps that enable the manufacture of composite constructions having simple or complex microstructures of one or more material phases. Further, molding techniques of this invention can be used to form either wear surfaces for use on a substrate, or can be used to form the substrate itself.

The types of materials useful for forming functionally-engineered wear surfaces using these molding techniques include the same materials discussed above. Applying agents, e.g., in the form of polymer binders, can be combined with these materials to enhance processability, e.g., to facilitate making a preformed green part by pressing and/or extrusion process. The composite construction formed by such molding technique can have a microstructure of two or more material phases arranged in either an ordered or random manner. Examples of functionally-engineered wear surfaces having an ordered or oriented material microstructure comprise a first region of a hard material dispersed within a second phase of a relatively more ductile material, as discussed in detail in U.S. patent application Ser. No. 08/903,668, which is incorporated herein by reference. Further examples of functionally-engineered composite constructions having an ordered or oriented microstructure are discussed in detail in U.S. patent application Ser. No. 09/499,929 filed on Feb. 8, 2000, and U.S. patent application Ser. No. 09/521,717 filed on Mar. 9, 2000, which are each incorporated herein by reference.

Molding techniques of this invention are better understood with reference to the following examples:

Thermoforming—Random Material Microstructure—WC—Co Cap on WC—Co Substrate

A preformed green part is manufactured by mixing, pressing and/or extruding to form a composite construction having a random microstructure. The material microstructure can comprise one, or two or more material phases. In this example embodiment, a preformed green part in the form of a cap (for placement over substrate in the form of a cutting insert) is produced. The desired functionally-engineered wear surface comprises cemented tungsten carbide, and the underlying substrate (insert body) is formed from cemented tungsten carbide having a relatively lower hardness, i.e., a higher fracture toughness.

Tungsten carbide and cobalt powders are mixed together at low temperature (130 □C), with an applying agent or polymer mixture. The total mixture may comprises in the range of from about 30 to 90 volume percent of solids, depending on particle characteristics and the particular polymer system. In an example embodiment, the polymer mixture comprises in the range of 10 to 60 percent of the total mixture volume. In a preferred embodiment, the polymer mixture comprises approximately 55 percent of the total mixture volume. A preferred polymer mixture for this example comprises approximately 90 percent by weight ethyl acetate (EEA) and 10 percent by weight white paraffin oil (otherwise known as HMO—heavy mineral oil). The mixture is cooled to room temperature and fragmented into small pieces.

The pieces are loaded into a heating mold operated at 120□C that is used to shape the heated pieces into the form of a cap. The contents of the mold is pressurized, causing the heated mixture to yield and flow into the mold, thereby conforming to the mold shape. The pressure ranges from 100 to 10,000 psi, and the operation last for only a few seconds. The assembly is then cooled to room temperature, preferably under pressure, and is the preformed green part is removed from the mold.

The preformed green part is positioned onto the intended substrate surface, thermally processed to drive out the polymer mixture, and is consolidated by high temperature/high pressure process described below to provide the desired functionally-engineered wear surface. Such thermoforming process can be used to provide functionally-engineered wear surfaces on substrate having layer thicknesses that are greater than that provided by dip coating, e.g., in the range of from 0.1 mm to 25 mm.

Thermoforming—Random Material Microstructure—WC—Co w/Diamond Granules on WC—Co Substrate A preformed green part is manufactured by mixing, pressing and/or extruding to form a composite construction having a random material microstructure. The material microstructure can comprise one, or two or more material phases. For example, a preformed green part having a random microstructure of two different material phases can be manufactured by combining a desired material powder (e.g., synthetic diamond powder) with a suitable polymer binder to form a first mixture, and by combining another desired material powder (e.g., WC/Co powder) with a suitable polymer binder to form a second mixture. The first mixture is granulized into diamond granules. The granules are combined with the second mixture and are pressed to form a composite construction having a microstructure of diamond granules dispersed within a substantially continuous matrix of WC/Co, as described in U.S. patent application Ser. No. 09/521,717 filed on Mar. 9, 2000.

The resulting preformed composite construction, comprising such microstructure, is formed into a thin disk that is loaded into a press. The disk composite construction is thermoformed into a final green product, either for placement onto a substrate surface or for forming the substrate itself, by pressing under temperature conditions in the range of from 30 to 150 □C, and under pressure conditions in the range of from 100 to 10,000 psi. For example, the thin disk can be pressed to form a green part having the shape of a cap that is placed over and sintered (by high temperature/high pressure process) to an insert used with a drill bit (see FIG. 3) to form a working surface thereon.

Thermoforming—Cellular/Oriented Material Microstructure

A preformed green part is manufactured by mixing, pressing and/or extrusion process to form a composite construction having an ordered cellular microstructure. The microstructure can comprise one, or two or more material phases. For example, a preformed green part having a microstructure of two different material phases can be manufactured by combining a desired material powder (e.g., synthetic diamond powder) with a suitable polymer binder to form a first mixture, and by combining another desired material powder (e.g., WC/Co powder) with a suitable polymer binder to form a second mixture.

Both of the resulting mixtures are then pressed into suitable shapes (e.g., a rod and a shell), and are pressed together and extruded to form an initial composite (e.g., comprising a rod of diamond surrounded by a shell of WC/Co), which is taken and combined with other such initial composites and pressed, extruded and recombined to arrive at the final composite comprising a cellular microstructure of a plurality of diamond material phases surrounded by a substantially continuous WC/Co material phase, e.g., as described in U.S. patent application Ser. No. 08/903,668.

The resulting preformed composite construction, comprising such cellular microstructure, is formed into a thin disk that is loaded into a press. The disk composite construction is thermoformed into a final green product, either for placement onto a substrate surface or for forming the substrate itself, by pressing under temperature conditions in the range of from 30 to 150 □C, and under pressure conditions in the range of from 100 to 10,000 psi. For example, the final green product can be in the form of a cap that is placed onto and sintered (by high temperature/high pressure process) to an insert used with a drill bit to form a working surface of the insert for subterranean drilling.

Thermoforming—Free Assembly Microstructure

A preformed green part is manufactured by mixing, pressing and/or extrusion process to form a composite construction having an ordered microstructure of multiple material phases. For example, a preformed green part having a random microstructure of two different material phases can be manufactured by building one or more multilayer laminate constructions of different materials, e.g., synthetic diamond powder, WC/Co powder, and the like, taking one or more slice of the multilayer laminate constructions, and arranging the slices to form a composite construction having a surface made up of the multiple layers.

The resulting preformed composite construction, comprising such microstructure, is formed into a thin disk that is loaded into a press. The disk composite construction is thermoformed into a final green product, either for placement onto a substrate surface or for forming the substrate itself, by pressing under temperature conditions in the range of from 30 to 150 □C, and under pressure conditions in the range of from 100 to 10,000 psi. For example, the final green product can be in the form of a cap that is placed onto and sintered to an insert used with a drill bit to form a working surface of the insert for subterranean drilling.

Powder Injection Molding

A powder injection molding mixture is prepared by combining in the range of from 40 to 70 percent by percent by volume material powder selected from the group of materials described above for forming functionally-engineered wear surfaces of this invention, within the range of from 30 to 60 percent by volume polymer binders and optional lubricant/surfactant additives. In an example embodiment, 55 to 60 percent by volume WC—Co powder (comprising approximately 10 percent by weight Co) is mixed with a polymer binder. A polymer binder comprising a mixture of polypropylene (30 to 35 percent by weight of the binder), paraffin wax (60 to 65 percent by weight of the binder), and stearic acid (up to about 5 percent by weight of the binder) is used. The above-identified ingredients are mixed together in a heated mixers, such as planetary mixer or sigma-blade mixer.

The resulting mixture is then granulated into granules having a desired particle size, and the granules are loaded into an injection molding machine operated at approximately 150° C. The granules are injected into a shaped mold to provide a particularly configured green part, and can be can be operated at low pressure conditions, e.g., at less than about 50 MPa, or at high-pressure conditions at greater than about 50 MPa, depending on the ingredients used. For example, the granules can be loaded into a mold that is shaped to provide a green part in the form of a cap that is configured to fit over an intended substrate surface, e.g., a rock bit cutting insert. The green part can be consolidated and sintered by high temperature/high pressure process described below to yield the desired functionally-engineered wear surface.

Each of the green parts formed according to the above-described polymer-assisted forming and thermoforming methods are consolidated and sintered using solid-state sintering techniques that avoid the undesired effects inherent with liquid phase sintering, such as material migration between boundaries of different material types. Prior to sintering, however, the green part is heated to about 200 to 400° C. in vacuum or flowing reactive and/or inert gases to debind and drive off the polymer composite. During the subsequent sintering process the debinded green part and substrate are both heated to an elevated temperature that is below the melting point of the binder phase material used to form the functionally-engineered wear surface, e.g., in an example embodiment below the melting temperature of cobalt.

Solid-state consolidation techniques useful for forming functionally-engineered wear surfaces of this invention include hot pressing, hot isostatic pressing (HIPing) as described in U.S. Pat. No. 5,290,507 that is incorporated herein by reference, and rapid omnidirectional compaction (ROC) as described in U.S. Pat. Nos. 4,945,073; 4,744,943; 4,656,002; 4,428,906; 4,341,577 and 4,124,888, which are each incorporated herein by reference.

Broadly speaking, the ROC process involves forming a mixture from the desired precursor materials, e.g., WC hard grains and a ductile metal binder in the event that the desired final material is a cemented tungsten carbide, along with a temporary wax binder. The mixture is pressed- in a closed die to a desired shape, such as a rock bit insert or a cap that forms a working surface of a rock bit insert. The resulting green insert is vacuum dewaxed and presintered at a relatively low temperature to achieve a density appreciably below full theoretical density. The presintering is only sufficient to permit handling of the insert for subsequent processing. The green insert is wrapped in a first container and is then placed in second container made of a high temperature high-pressure selfsealing ceramic material. The second container is filled with a special glass powder and the green part disposed within the first container is embedded in the glass powder. The glass powder has a lower melting point than that of the green part, or of the ceramic die. The second container is placed in a furnace to raise it to the desired consolidation temperature, that is also above the melting point of the glass. For example, for a green part formed from WC—Co, the consolidation temperature is in the range of from 1,000.degree. C. to 1,280.degree. C. The heated second container with the molten glass and green part immersed inside is placed in a hydraulic press having a closed cylindrical die and a rain that presses into the die. Molten glass and the green part are subjected to high pressure in the sealed ceramic container. The part is isostatically pressed by the liquid glass to pressure as high as 120 ksi. The temperature capability of the entire process can be as high as 1,800.degree. C., depending on the particular types of materials selected to form the green part. The high pressure is applied for a short period of time, e.g., less than about five minutes and preferably one to two minutes, and isostaticaily compacts the green part to essentially 100 percent density.

Conventional liquid phase consolidation techniques are generally not thought to be useful for forming composite constructions of this invention because of the tendency for the binder material to migrate, thereby causing the material phases to become distorted or unoriented. However, liquid phase consolidation techniques may be used that operate under conditions of reduced temperature or where the structures being bonded differ only in grain size or hard material while matrix levels are similar. For example, reactive liquid phase sintering relates to a process whereby one or more of the constituent elements is capable of releasing energy upon formation (i.e., enthalpy formation is high). This energy is released as heat which can (if conditions are proper) produce a self-propagating reaction that will consolidate the component at low temperature (that being the temperature needed to initiate the reaction). Thus, functionally-engineered wear surfaces of this invention can be sintered using this technique if one of the material phases contains an element that, upon reaching an ignition temperature, will operate to densify the entire composition. This technique is nonreversible, meaning that the reaction product will not go to a molten state at the low temperature used to initiate the reaction due to an increased melting point of the compound in comparison to its constituent elements.

Other solid-state consolidation techniques useful for making order composite constructions of the invention include those incorporating a rapid heating step such as microwave sintering, plasma-activated sintering, and other types of field-assisted sintering. Each of these techniques have can be effective at producing a final composite construction having the retained oriented or ordered microstructure.

Examples of consolidation techniques using rapid heating methods include field-assisted sintering and laser heating. Field-assisted sintering used an electromotive field to generate rapid heating and improves surface transport. Often, energy is concentrated on surface asperities. Several heating techniques for conducting field-assisted sintering exist, including but not limited to induction heating, microwave, plasma and electric discharge. Induction sintering uses alternating current to create a magnetic field with the die material to induce eddy currents. These eddy currents serve to rapidly heat a component. Similarly, microwave sintering allows for rapid heating of a component based on its (or susceptor) material properties. A susceptor is a material that will do the heating in either induction or microwave when the compact is either nonconductive or transparent to microwave. Besides rapid heating, microwave sintering is believed to lower activation energies for diffusion and promote steep concentration gradients (further increasing diffusivity). Microwave sintering or microwave-assisted sintering are consolidation techniques, typically at ambient pressure, which enhances densification because of rapid heating and homogenization of the part=s internal temperature and creation of plasma at all powder asperities to create an enhanced surface.

Laser heating is an approach that can be used to primarily sinter a thin section of powder (wherein the depth of penetration is very limited) and, hence, is often used for rapid prototyping machines that build layer by layer.

Electrical discharge heating is used to heat a component (within a hot press) via electrical resistance. Typically, a hot press is employed since constant contact (pressure) is needed and graphite adds in the electrical conduction/heating of a component. When the electric filed is pulsed, plasma is generated therefrom at the asperities. Likewise, plasma sintering is similar in that an electromotive field is generated resulting in an enhanced diffusion. A secondary type of plasma sintering is to induce an external plasma using RF heating of gaseous species to promote localized heating and concentration gradients. However, this system is not as advantageous as the system described below due to the lack of applied pressure.

Plasma-assisted sintering is a technique whereby plasma is generated within the powder compact. This plasma enhances surface activated diffusion, which promotes densification at lower sintering temperatures and/or promotes shorter sintering times. The instantaneous electric pulses using high currents generate the plasma. Often the plasma-assisted sintering is operated effectively applied to hot pressing, where the electric field pulses are deliver to the compact axially through the use of graphite compaction rods. This technique is also referred to as field-assisted sintering. Field strengths vary for different materials, but generally range in from 18 to 50 V/cm.

A key feature of each of the above-described forming and sintering methods is that they enable formation of functionally-engineered wear surfaces onto substrate interface surfaces that have nonplanar or otherwise irregular geometries. This feature is highly desirable, for example, when the substrate is a portion of a drill bit, e.g., a cutting insert, characterized by having a curved or nonplanar interface surface. Additionally, green parts sintered according to the methods presented avoid the undesired phenomena of material constituent migration, thereby ensuring that the desired material compositions in the surface layer and substrate remain unchanged and that the desired related physical properties be retained.

What is claimed is:

1. A method for forming a wear resistant surface onto a surface of a cutting element fmm a subterranean drill bit, the method comprising the steps of:

forming a conformable mixture consisting of a cermet precursor material and polymer binder;

applying the mixture onto the surface of the cutting element when the cutting element is in a fully densified form; and sintering the applied mixture to form the wear resistant surface;

wherein the sintered wear resistant material has a hardness that is greater than that of the underlying cutting element, and wherein the sintered wear resistant material is a cermet having a material microstucture consisting of:

a first phase of grains selected from the group consisting of carbides, borides, nitrides and carbonitrides of W, Ti, Mo, Nb, V, Hf, Ta and Cr refractory metals; and a second phase of a binder material selected from the group consisting of Co, Ni, Fe and alloys thereof.

2. The method as recited in claim 1 wherein during the step of applying, the mixture is in the form of a slurry that is applied in the form of a coating onto the cutting element surface.

3. The method as recited in claim 1 wherein prior to the step of applying, the mixture is preformed into a green-state part that is configured to fit over the cutting element surface and, during the step of applying, the part is placed over the cutting element surface.

4. The method as recited in claim 1 wherein the wear resistant material is WC—Co.

5. A method for forming a wear resistant surface onto a surface of a subterranean drill bit cutting element comprising the steps of:

forming a conformable mixture consisting of a cermet precursor material and a polymer binder, the conformable mixture comprising;

a plurality of green state particles each comprising a first phase of grains selected form the group consisting of carbides, borides, nitrides, and carbonitrides of W, Ti, Mo, Nb, V, Hf, Ta and Cr refractory metals, and a second phase of a binder material selected from the group consisting of Co, Ni, Fe, and alloys thereof; and a binder matrix, wherein the plurality of green-state particles is dispersed within the matrix, the binder matrix being selected from the group of materials consisting of steel, Co, Ni, Fe, W, Mo, Ti, V, Nb, and alloys thereof;

applying the conformable mixture onto an interface surface of the cutting element; and sintering the applied conformable mixture by high pressure/high temperature process to thereby form the wear resistant surface;

wherein after the sintering step, the wear resistant surface has a hardness that is different than that of the underlying cutting element.

6. The method as recited in claim 5 wherein during the step of applying, the cutting element is in a preexisting rigid state.

7. The method as recited in claim 5 wherein after the sintering step, the wear resistant surface has a hardness that is greater than that of the underlying cutting element.

8. The method as recited in claim 5 wherein the green-state particle first phase is WO and the binder material is Co.

9. A method of forming a wear resistant surface onto an interface surface of a drilling bit cutting element comprising the steps of:

forming a conformable mixture consisting of a cermet precursor and a polymer binder by combining one or more powders selected from the group consisting of cermets, carbides, borides, nitrides, carbonitrides, refractory metals, and combinations thereof, with the polymer binder;

applying the conformable mixture onto an interface surface of the cutting element while the cutting element is in a fully-densified form; and pressurizing the applied conformable mixture under conditions of elevated temperature to consolidate and sinter the powders, thereby forming the wear resistant surface;

wherein the cutting element is formed from a carbide-containing cermet material and the wear resistant material has a material microstructure consisting of:

a first phase of grains selected from the group consisting of carbides, borides, nitrides, and carbonitrides of W, Ti, Mo, Nb, V, Hf, Ta, and Cr refractory metals; and a second phase of a binder material selected from the group consisting of Co, Ni, Fe, and alloys thereof.

10. A method of forming a wear resistant surface onto an interface surface of a rotary cone rock bit cutting element comprising the steps of:

forming a slurry consisting of a cermet precursor material and a polymer binder by combining a plurality of green-state particles with a binder matrix material and the polymer binder, the green-state particles each comprising:

a first phase of grains selected from the group consisting of carbides, borides, nitrides, and carbonitrides of W, Ti, Mo, Nb, V, Hf, Ta, and Cr refractory metals; and a second phase of binder material selected from the group consisting of Co, Ni, Fe, and alloys thereof, the binder matrix selected from the group consisting of Co, Ni, Fe, and alloys thereof;

applying the slurry onto an interface surface of the cutting element while the cutting element is in a fully-densified form, wherein the interface surface is nonplanar; and pressurizing the applied slurry under conditions of elevated temperature to consolidate and sinter the powders, thereby forming the wear resistant surface;

wherein the cutting element is formed from a carbide material and the wear resistant material has a material microstructure consisting of:

a first phase of hard regions formed from the green-state particles; and a second continuous matrix phase formed from the binder matrix and separating the hard regions from one another.

* * * * *